United States Patent [19]

Sanford et al.

[11] 4,285,730

[45] Aug. 25, 1981

[54] MOLDABLE GLASSES

[75] Inventors: Leon M. Sanford, Painted Post; Paul A. Tick, Corning, both of N.Y.

[73] Assignee: Corning Glass Works, Corning, N.Y.

[21] Appl. No.: 198,437

[22] Filed: Oct. 20, 1980

Related U.S. Application Data

[63] Continuation-in-part of Ser. No. 82,150, Oct. 5, 1979, abandoned.

[51] Int. Cl.³ .................................................. C03C 3/16
[52] U.S. Cl. ................................. 106/47 R; 106/47 Q
[58] Field of Search ............................ 106/47 R, 47 Q

[56] References Cited

U.S. PATENT DOCUMENTS

| | | | |
|---|---|---|---|
| 3,341,453 | 9/1967 | Ralston | 106/47 R |
| 3,935,018 | 1/1976 | Ray et al. | 106/47 Q |
| 3,954,484 | 5/1976 | Broemer et al. | 106/47 Q |
| 3,989,532 | 11/1976 | Ray et al. | 156/47 Q |
| 4,026,714 | 5/1977 | Lewis | 106/47 Q |

*Primary Examiner*—Earl C. Thomas
*Assistant Examiner*—Mark Bell
*Attorney, Agent, or Firm*—Clinton S. Janes, Jr.

[57] ABSTRACT

The instant invention is concerned with the production of glasses which are capable of being molded or otherwise shaped under pressure at temperatures not exceeding about 450° C. Such glasses consist essentially, in mole percent as analyzed on the oxide basis, of at least 20% but less than 50% $P_2O_5$, 15–45% $R_2O$, wherein $R_2O$ consists of 0–45% $Li_2O$, 0–20% $Na_2O$, and 0–10% $K_2O$, and 0–20% RO, wherein RO consists of 0–10% MgO, 0–15% CaO, 0–20% SrO, and 0–20% BaO, with about 0.3–3% by weight F as analyzed in the final glass. Useful additions to the base compositions include PbO, $La_2O_3$, ZnO, and $B_2O_3$.

5 Claims, No Drawings

MOLDABLE GLASSES

This application is a Continuation-In-Part of application Ser. No. 82,150 filed Oct. 5, 1979, now abandoned.

BACKGROUND OF THE INVENTION

The field of molded optics has been the subject of extensive research in recent years. Thus, the practice has the great advantage in permitting lenses to be molded that are difficult to manufacture utilizing conventional grinding and polishing methods. For example, U.S. Pat. Nos. 4,093,469 and 4,098,596 disclose the reshaping of a preform of hydrosilicate glass, i.e., a glass containing a substantial amount of water in its structure, into a lens via compression molding. The surface of the lens replicates the mold surface and is equivalent to a ground and polished optical surface.

The use of hydrosilicate glasses as precursor materials in molding shapes has several practical disadvantages. First, the glass composition must be relatively readily subject to hydration; hence, the range of operable compositions and the resulting properties of the final product are quite limited. Second, the glass must be subjected to a hydration treatment. Third, extremely careful control of atmosphere must be exercised during the molding operation. Accordingly, glasses which can be molded or otherwise shaped under pressure at relatively low temperatures, i.e., temperatures below about 450° C. and preferably below 400° C., without the need for hydration could prove to have high utility. It would be necessary, of course, for such glasses to demonstrate the basic practical characteristics found in more conventional glasses such as, for example, good glass quality coupled with reasonable chemical durability and stability against devitrification.

OBJECTIVES OF THE INVENTION

The primary objective of the instant invention is to produce anhydrous glasses having the capability of being molded or otherwise shaped under pressure at temperatures below about 450° C. while retaining the fundamental practical properties of conventional glasses.

A more practical and preferred objective is to produce such glasses which can be shaped under pressure at temperatures below 400° C. and which exhibit the necessary qualities for use in optical and ophthalmic applications.

SUMMARY OF THE INVENTION

We have discovered that those objectives can be achieved in glasses having compositions within the alkali metal oxide-alkaline earth metal oxide-fluoride-phosphate system ($R_2O$-RO-F-$P_2O_5$). The presence of fluoride (F) is demanded since, not only does its inclusion expand the range of operable glass-forming compositions in the basic phosphate system, but also, and most importantly and desirably, it lowers the optical dispersion of the glasses and, frequently, will reduce the transition temperature ($T_g$) thereof. This latter feature enables the glass batches to be melted at lower temperatures and permits the shaping of glass bodies at very low temperatures, e.g., at temperatures below 400° C. Other optional additions useful in modifying the physical properties of the glass, e.g., refractive index, glass stability, and chemical durability, include PbO, ZnO, $B_2O_3$, and $La_2O_3$. The presence of $B_2O_3$ appears to be especially effective in enhancing the chemical durability of the glass, although it causes a rise in the $T_g$ of the glass. $Al_2O_3$ markedly increases the $T_g$ of the glass so its essential absence is much preferred, although very limited quantities can be tolerated.

The operable glasses have base compositions consisting essentially, expressed in mole percent as analyzed on the oxide base, of at least 20% but less than 50% $P_2O_5$, 15-45% alkali metal oxides ($R_2O$), consisting of 0-45% $Li_2O$, 0-20% $Na_2O$, and 0-10% $K_2O$, and 0-20% alkaline earth metal oxides (RO) consisting of 0-10% MgO, 0-15% CaO, 0-20% SrO, and 0-20% BaO, with about 0.3—3% by weight F, as analyzed in the final glass. As will be demonstrated hereinafter, the retention of fluoride in the glass is very low. Moreover, the amount of fluoride retained in the glass can be markedly altered by varying the batch melting conditions, particularly the temperatures required to fuse the batch materials. Therefore, calculating the fluoride content from the batch does not provide a good method for specifying operable amounts thereof. Rather, an analysis thereof in the final glass provides the only satisfactory measure.

As optional ingredients, expressed in terms of mole percent as analyzed on the oxide basis, PbO may be included in amounts up to 20%, $La_2O_3$ up to 7%, and ZnO up to 12%. If desired, $B_2O_3$ may be substituted in part for $P_2O_5$. Hence, where the $P_2O_5$ content is less than about 30%, $B_2O_3$ may be incorporated in amounts up to about 25%. Such a glass then becomes, in essence, a borophosphate-based composition. At $P_2O_5$ concentrations of 45% and higher, however, the $B_2O_3$ content will be maintained no higher than about 5%, if included at all. The total of all optional ingredients other than RO and $B_2O_3$ will not exceed about 25%, with the total of all optional constituents exclusive of RO being less than about 35%.

Glasses containing high contents of $P_2O_5$ in their compositions are frequently not anhydrous, i.e., substantial amounts of water are present in their structures. It is believed that the instant glasses are anhydrous because the inclusion of fluoride in the batches drives off water during the melting of the batch ingredients.

PRIOR ART

Phosphate-based glasses are well known in the glass art. Their greatest disadvantage has been their relatively poor chemical durability and their tendency to devitrify during forming and working. Also, in the area of optical and ophthalmic applications, the phosphate glasses exhibited different grinding and polishing behavior from that demonstrated by silicate glasses.

U.S. Pat. No. 2,227,082 discloses aluminophosphate glasses consisting essentially, in weight percent, of 34-44% $P_2O_5$ and 20-30% $Al_2O_3$, with the remainder of the composition being made up of $Na_2O$, $K_2O$, $Li_2O$, BaO, $B_2O_3$, and ZnO. No specific utility is ascribed to any of the glasses.

U.S. Pat. No. 2,390,191 described aluminoborophosphate glasses statedly designed for sealing or fusing together glass and ceramic bodies. The compositions thereof consisted essentially, by weight, of 28-38% $P_2O_5$, 8-16%, 13-22% $B_2O_3$, 24-34% ZnO+MgO+BaO, and 6-10% $Na_2O$.

U.S. Pat. No. 2,441,853 teaches lead aluminophosphate glasses suitable for making glass-to-copper seals. The glasses were asserted to demonstrate good chemical durability and a high coefficient of thermal expansion and consisted essentially, in weight percent, of 28–38% $P_2O_5$, 8–20%, $Al_2O_3$, 15–40% PbO, 10–20% $Na_2O+K_2O$, and 0–20% $B_2O_3$.

U.S. Pat. No. 2,430,539 sets out an area of titanium fluophosphate glasses statedly useful in optical applications. $TiO_2$ was included in the composition to enhance durability. The glasses were expressed by the formula $AF\text{-}TiO_2\text{-}M(PO_y)_z$, wherein AF represented an alkali metal fluoride and $M(PO_y)_z$ designated a phosphate of aluminum or beryllium, customarily a meta- or orthophosphate.

U.S. Pat. No. 2,496,824 describes iron fluophosphate glasses which, because of the low coloration therein, were asserted to be suitable for optical applications. The compositions, in weight percent, consisted essentially of 20–40% NaF, 22–40% LiF, 2–15% $Fe_2O_3$, and 55–76% $Al(PO_3)_3$.

U.S. Pat. No. 2,481,700 discloses fluophosphate glasses deemed to be useful for optical applications complying with the formula $AF\text{-}MF_2\text{-}R$, wherein AF indicates a fluoride selected from the group of LiF, NaF, and KF, $MF_2$ represents a fluoride selected from the group of $MgF_2$, $CaF_2$, $SrF_2$, $BaF_2$, and $ZnF_2$, and R designates an aluminum and/or a beryllium phosphate. AF constitutes 7–54% by weight, $MF_2$ comprises 0–58% by weight, and R makes up 30–90% by weight, the atomic proportion of fluorine to phosphorus in the glass batch being between 0.23 and 2.9.

U.S. Pat. No. 3,281,254 involves glasses statedly useful for optical purposes having compositions ranging, in weight percent, of about 15–48% aluminum metaphosphate, 16–23.8% alkali metal metaphosphate, 23.8–41% alkaline earth metaphosphate, and 1–21% of a fluoride selected from the group of $PbF_2$, LiF, $KHF_2$, $ZnSiF_2$, $BaF_2$, and $MgF_2$.

U.S. Pat. No. 3,656,976 reveals fluophosphate glasses cited as being operable in optical applications consisting essentially, in cationic percent, of 15–40% $PO_{2.5}$, 0.5–21% $BO_{1.5}$, the ratio B:P being less than 0.7, 0.7–40% alkali metal fluoride, 10–60% alkaline earth metal fluoride, and 10–25% $ALF_3$.

U.S. Pat. No. 3,732,181 discusses low melting glasses having transformation ranges in the temperature interval of 100°–400° C. which can be co-molded with organic polymers. Three general glass composition ranges are studied: (1) at least 95 mole percent $PbO+P_2O_5$, the PbO content ranging about 20–80 mole percent; (2) at least 95 mole percent $PbO+R_2O+P_2O_5$, PbO being present at 5–60 mole percent, $R_2O$ at 5–35%, and $P_2O_5$ up to 85 mole percent; and (3) 5–30 mole percent PbO, 5–30 mole percent $R_2O$, and 18–85 mole percent $P_2O_5$, $PbO+R_2O+P_2O_5$ being at least 95 mole percent. Such glasses are particularly useful in the fiber reinforcement of thermoplastic organic polymers.

U.S. Pat. No. 3,926,649 relates to low melting borophosphate glasses which demonstrate relatively good resistance to attack by water which consist essentially, in mole percent, of 75±2.5% $P_2O_5+B_2O_3$, the molar ratio $P_2O_5:B_2O_3$ being 15:1 to 6:1, and 25+2.5% of at least one oxide selected from the group $R_2O$, RO, and ZnO.

U.S. Pat. No. 3,935,018 describes borophosphate glasses having low transformation temperatures ($T_g$) and consisting essentially, in mole percent, of 1.2–3.5% $B_2O_3$, 50–72% $P_2O_5$, 0–30% PbO, 0–5% transition metal oxides, with the remainder of the glasses consisting of an alkali metal oxide and an alkaline earth metal oxide and/or ZnO. Fluoride is nowhere mentioned and the glasses are not anhydrous, i.e., they may contain up to 5% by weight water.

U.S. Pat. No. 3,954,484 is concerned with alkaline earth metal aluminofluorophosphate glasses having indices of refraction higher than 1.57, Abbe numbers less than 70, and relatively high positive anomalous partial dispersions. The glasses are not asserted to exhibit low transformation temperatures, the glasses are free from alkali metal oxides, and the glass compositions demand the inclusion of substantial amounts of $Al_2O_3$.

U.S. Pat. No. 3,989,532 is directed specifically to glasses which resist misting when exposed to humid environments and which demonstrate low transition temperatures ($T_g$). The compositions consist essentially, in mole percent, of 2.7–20% alkline earth metal oxides and greater than 52% $P_2O_5$, with the remainder being composed of the optional presence of $B_2O_3$ and/or alkali metal oxides. Fluoride is not referred to, the glasses are not anhydrous, i.e., they may contain up to 5% by weight water in their structure, and the glass surfaces are stated to be tacky.

U.S. Pat. No. 3,964,919 encompasses phosphate glasses having low softening points and improved resistance to water attack. The glasses consisted essentially, in mole percent, of 50–75% $P_2O_5$, 15–49.9% $R_2O$ and/or RO, 0–2.6% $CrO_3$, 0–7% $MoO_3$, and 0–7% $WO_3$, $CrO_3+MoO_3+WO_3$ being 0.1–10%.

U.S. Pat. No. 4,026,714 relates to glasses having low transition temperatures ($T_g$) and evidencing resistance to misting when subjected to moist atmospheres. The glasses consist essentially, in mole percent, of 52–72% $P_2O_5$, 1–12% PbO, 3.5–12% $B_2O_3$ and/or $SiO_2$ and/or $Al_2O_3$, and 4–30% alkali metal oxide and/or alkaline earth metal oxide and/or Zno. Fluoride is not mentioned, the glasses are not anhydrous in that they may contain up to 5% by weight water in their structure, and the glass surfaces are noted as being sticky.

U.S. Pat. No. 4,046,540 discloses the injection molding of phosphate glasses having transformation temperatures no higher than about 300° C. Operable glasses are claimed which contain at least 25 mole percent $P_2O_5$ with compositions suitable for optical lenses consisting, in mole percent, of 58–65% $P_2O_5$, 1.2–3.5% $B_2O_3$, 4–6% PbO, 12–20% $Na_2O$, and the balance being selected from $Li_2O$, CaO, and MgO.

DESCRIPTION OF PREFERRED EMBODIMENTS

Table I records several exemplary glass batches, expressed on the oxide basis in terms of parts by weight, illustrating the parameters of the instant invention. Because the sum of the constituents totals or closely approximates 100, for all practical purposes the values reported in Table I may be deemed to be recited in terms of weight percent. Desirably useful batch materials included alkali metal and alkaline earth meta- and orthophosphates. The use of $BPO_4$, $Al(PO_3)_3$, $Pb(PO_3)_2$, and $Zn_3(PO_4)_2$ was found to be instrumental in improving glass quality. $P_2O_5$ proved to be a poor choice of batch material since it is hygroscopic, it cannot be ball-milled, and it volatilizes readily during the initial stages of melting. Ammonium phosphate was also determined to be an unacceptable starting ingredient because, although it can be ballmilled, it also volatilizes rapidly during the early stages of melting. Moreover, it is a reducing agent which attacks platinum and can reduce such easily-reducible metal oxides as PbO. Inasmuch as it is not known with which cation(s) the fluoride is combined, it is merely reported in terms of the batch ingredient by which it was incorporated into the glass. Table IA reports the exemplary compositions in terms of mole percent calculated to the nearest 0.1%.

The batch ingredients were compounded, ballmilled together to aid in achieving a homogeneous melt, and then deposited into a 96% silica or platinum crucible. Although the examples listed in Table I represent laboratory scale melts only, it will be appreciated that larger melts in pots or continuous melting tanks can be contemplated with the cited compositions. The crucible was moved to a furnace operating at about 600°–900° C. and the batch melted for about one hour with or without stirring. The melt was then poured into a steel mold to yield a glass slab having the dimensions of about $6'' \times 6'' \times \frac{1}{2}''$ and the slab immediately transferred to an annealer operating at about 325° C.

TABLE I

|  | 1 | 2 | 3 | 4 | 5 | 6 | 7 | 8 | 9 |
|---|---|---|---|---|---|---|---|---|---|
| $P_2O_5$ | 63.4 | 52.9 | 52.6 | 65.8 | 65.8 | 55.1 | 53.0 | 36.2 | 78.0 |
| $Li_2O$ | 5.5 | 8.3 | 2.0 | 4.9 | 4.8 | 4.1 | — | — | — |
| $Na_2O$ | 11.5 | 17.2 | 3.9 | 10.1 | 10.1 | 8.4 | — | — | — |
| $MgF_2$ | 7.7 | 7.7 | — | — | — | — | — | — | 5.0 |
| $B_2O_3$ | 2.0 | 4.0 | — | — | — | — | 2.0 | 2.0 | 2.0 |
| ZnO | 10.0 | 10.0 | — | — | — | — | — | — | — |
| PbO | — | — | 19.5 | — | — | — | — | — | — |
| $BaF_2$ | — | — | 20.0 | 4.8 | 9.7 | 16.2 | 30.0 | — | — |
| BaO | — | — | — | 15.4 | 9.7 | 16.2 | — | — | — |
| LiF | — | — | — | — | — | — | 7.5 | 7.5 | 7.5 |
| NaF | — | — | — | — | — | — | 7.5 | 7.5 | 7.5 |
| $ZnF_2$ | — | — | — | — | — | — | — | 6.8 | — |
| PbF | — | — | — | — | — | — | — | 40.0 | — |

|  | 10 | 11 | 12 | 13 |
|---|---|---|---|---|
| $P_2O_5$ | 73.0 | 48.2 | 47.0 | 40.0 |
| LiF | 7.5 | 4.7 | 16.0 | 15.0 |
| $ZnF_2$ | 10.0 | 6.8 | — | — |
| $PbF_2$ | — | 40.2 | — | — |
| $B_2O_3$ | 2.0 | — | 24.0 | 20.0 |
| ZnO | — | — | 13.0 | — |
| $BaF_2$ | — | — | — | 25.0 |
| NaF | 7.5 | — | — | — |

TABLE IA

|  | 1 | 2 | 3 | 4 | 5 | 6 | 7 | 8 | 9 |
|---|---|---|---|---|---|---|---|---|---|
| $P_2O_5$ | 40.9 | 30.2 | 53.0 | 50.6 | 50.9 | 45.3 | 35.9 | 26.1 | 48.8 |
| $Li_2O$ | 16.9 | 22.6 | 9.3 | 18.0 | 17.6 | 15.9 | — | — | — |
| $Na_2O$ | 17.0 | 22.5 | 9.3 | 18.0 | 17.8 | 15.8 | — | — | — |
| $MgF_2$ | 11.3 | 10.0 | — | — | — | — | — | — | 7.1 |
| $B_2O_3$ | 2.6 | 4.7 | — | — | — | — | 2.8 | 2.9 | 2.5 |
| ZnO | 11.3 | 10.0 | — | — | — | — | — | — | — |
| PbO | — | — | 12.5 | — | — | — | — | — | — |
| $BaF_2$ | — | — | 15.9 | 3.0 | 6.7 | 10.7 | 16.4 | — | — |
| BaO | — | — | — | 10.4 | 7.0 | 12.3 | — | — | — |
| LiF | — | — | — | — | — | — | 27.8 | 28.2 | 25.7 |
| NaF | — | — | — | — | — | — | 17.1 | 19.5 | 15.9 |
| $ZnF_2$ | — | — | — | — | — | — | — | 6.7 | — |
| $PbF_2$ | — | — | — | — | — | — | — | 16.6 | — |

|  | 10 | 11 | 12 | 13 |
|---|---|---|---|---|
| $P_2O_5$ | 46.5 | 45.3 | 22.7 | 21.7 |
| LiF | 26.1 | 24.1 | 42.3 | 44.7 |
| $ZnF_2$ | 8.7 | 8.8 | — | — |
| $PbF_2$ | — | 21.8 | — | — |
| $B_2O_3$ | 2.6 | — | 23.6 | 22.5 |
| ZnO | — | — | 11.4 | — |
| $BaF_2$ | — | — | — | 11.1 |
| NaF | 16.1 | — | — | — |
| $Li_2O$ | — | — | — | — |
| $MgF_2$ | — | — | — | — |

Refractive indices, $n_D$, (utilizing the Becke line method) and Abbe numbers, $V_e$, were measured on the several samples and those values are reported in Table II.

TABLE II

| Example No. | $n_D$ | $V_e$ | Example No. | $n_D$ | $V_e$ |
|---|---|---|---|---|---|
| 1 | 1.530 | 64.3 | 8 | 1.654 | — |
| 2 | 1.530 | 64.4 | 9 | 1.502 | 67.8 |
| 3 | 1.599 | 50.7 | 10 | 1.507 | — |
| 4 | 1.523 | 65.9 | 11 | 1.652 | — |
| 5 | 1.523 | 66.7 | 12 | 1.55 | — |
| 6 | 1.552 | 64.5 | 13 | 1.564 | — |
| 7 | 1.542 | — |  |  |  |

As would be expected, the glasses generally exhibit low dispersions except for those compositions containing substantial quantities of lead.

To explore the chemical durability of the glasses, Example 3 of the exemplary compositions was subjected to an accelerated weathering resistance test. The procedure involves exposing polished glass plates within a chamber to a moving air atmosphere at a relative humidity of about 98% with the temperature being held at about 50° C.

Inasmuch as phosphate glasses are well-recognized as commonly demonstrating poor resistance to weathering, an antireflective coating, most generally of $MgF_2$, has frequently been applied to glasses designed for use in optical applications. Such coatings not only reduce reflection but also serve to protect the glass surface from attack by moisture from the ambient environment. Accordingly, such a coating was applied to specimens of the inventive glasses and the above-described weathering test conducted on samples of coated and uncoated glasses.

Specimens for use in the weathering test consisted of squares having the dimensions $1'' \times 1'' \times \frac{1}{8}''$ with all surfaces polished. Coatings of $MgF_2$ having a thickness of approximately 1320 Å were evaporated onto one face of each sample utilizing conventional techniques with a commercial evaporator. Reagent grade $MgF_2$ was evaporated from a tungsten boat at ambient temperature (23° C.) under a vacuum of about $5 \times 10^{-6}$ torr. The samples were cleaned with soap and water prior to coating.

Inspection of the test squares showed extensive corrosion and frosting of the uncoated squares after four hours, whereas comparable attack of the coated specimens was not observed until after about 48 hours. Examination of the coated surfaces revealed the presence of blisters surrounding pin holes in the $MgF_2$ films. Furthermore, the weathering products from the uncoated edges were seen to have encroached upon the coated surfaces and attacked the film.

In summary, the $MgF_2$ coating imparted a significant improvement in weathering resistance to the glass. Failure of the coatings is deemed to be the result of defects therein, presumably due to faulty deposition techniques.

To gauge the resistance of the inventive glasses to liquids of various pH values, squares of Example 3 having dimensions of about $1'' \times 1'' \times \frac{1}{8}''$ and polished surfaces were subjected to the following three tests: immersion in boiling distilled water for one hour; immersion for 15 minutes at room temperature in an aqueous 10% by weight NaOH solution; and immersion for 10 minutes at room temperature in an aqueous 10% by weight HCl solution. The specimens were cleaned with methanol and dried at 150° C. prior to and subsequent to testing.

Table III records the durabilities of the several samples as represented in terms of weight loss per unit surface area (milligrams per square centimeter).

TABLE III

| Test | Weight Loss |
|---|---|
| Boiling Water | 2.02 mg/cm$^2$ |
| 10% NaOH | 1.64 mg/cm$^2$ |
| 10% HCl | 1.7 mg/cm$^2$ |

Table IV reports the transition temperature ($T_g$) and the crystallization temperature ($T_c$) of the exemplary compositions set out in Table I, as determined from DSC (Differential Scanning Calorimetry) curves. Each of these measurements is useful in pointing out the substantial effects upon glass viscosity which minor changes or additions in composition may have.

TABLE IV

| Example No. | $T_g$ | $T_c$ | Example No. | $T_g$ | $T_c$ |
|---|---|---|---|---|---|
| 1 | 300° C. | None | 9 | 270° C. | None |
| 2 | 300° C. | 460° C. | 10 | 230° C. | None |
| 3 | 270° C. | None | 11 | 270° C. | None |
| 4 | 270° C. | 500° C. | 12 | 325° C. | |
| 5 | 280° C. | 430° C. | 13 | 345° C. | |
| 6 | 300° C. | 475° C. | | | |

Preform glass shapes could be molded into articles of desired geometries at temperatures somewhat above the transition temperature of the individual glass. In general, a glass viscosity of between about $10^9$–$10^{10}$ poises is preferred, this viscosity customarily being achieved when the glass was approximately 50° C. or more above the transition temperature thereof. Such viscosities permit forming at pressures not exceeding 25,000 psig. As will be recognized, glasses at higher viscosities can be employed but the molding pressure must necessarily be increased. Accordingly, a practical minimum molding temperature has been deemed to lie in the area of about 25° C. above the transition temperature of the glass. Glasses having viscosities as low as $10^6$ poises can be successfully molded but at the sacrifice of requiring higher temperatures, thereby hazarding crystal development, and with no substantial improvement in product quality.

In exploring the capability of the various glasses for molding, a 0.5″ diameter mold fashioned from tungsten carbide and coated with a noble metal alloy release coating was used. The mold had a concave surface configuration with a tungsten carbide sleeve and was heated by an induction coil.

Table V reports a number of moldings made with the glasses of Table I including the temperature, dwell time, and pressure utilized in each case. Each of the molded shapes readily released from the mold.

TABLE V

| Example No. | Molding Temperature | Molding Pressure | Dwell Time |
|---|---|---|---|
| 1 | 370° C. | 8000 psig | None |
| 3 | 370° C. | 2000 psig | 0.5 minute |
| 3 | 350° C. | 8000 psig | None |
| 8 | 300° C. | 8000 psig | None |
| 9 | 300° C. | 8000 psig | None |

In general, the upper temperature limit will depend upon two practical variables: (1) the creep resistance of the mold substrate which, in turn, is a function of temperature and applied pressure; and (2) the resistance to oxidation of any mold release coating applied to the mold. For example, a layer of chromium is initially deposited upon the tungsten carbide mold to act as an adhesive for the noble metal alloy coating. This chromium layer oxidizes at temperatures above 600° C. Consequently, if molding temperatures higher than 600° C. are to be employed, an environment of inert gas will be necessary to prevent oxidation of the chromium. Accordingly, molding temperatures not exceeding 400° C. are much preferred.

Materials other than tungsten carbide can comprise the molding equipment, so long as such are inert to the glass composition. However, the good machining characteristics of tungsten carbide have recommended their utility in the molding of high quality optics.

Glasses which evidence crystallization during a DSC run can be successfully molded as long as the nucleation temperature is not reached during the shaping process.

The retention of fluoride in the inventive glasses has been found to be on the order of about 10–15% and that of $P_2O_5$ to be on the order of 85–95%. These circumstances are evidenced by an examination of Table VI where an analysis of Example 3 of Table I is compared with the amounts of the ingredients batched (values reported in terms of weight percent on the oxide basis). For ease in comparison, the fluoride content is simply recited in terms of F.

TABLE VI

| | Batched | Analyzed |
|---|---|---|
| $P_2O_5$ | 52.6 | 48 |
| PbO | 19.5 | 23.8 |
| BaO | 16.5 | 21.43 |
| $Li_2O$ | 2.0 | 2.09 |
| $Na_2O$ | 3.9 | 4.08 |
| F | 5.4 | 0.56 |

To achieve the best optical quality products coupled with excellent moldability, viz., having the capability of being shaped at temperatures of 350° and lower, the base glass compositions will consist essentially, expressed in mole percent on the oxide basis, of at least 40% $P_2O_5$, 17–25% $Li_2O+Na_2O$, consisting of 5–15% $Li_2O$—5–15% $Na_2O$, 10–15% BaO, and 10–15% PbO with about 0.3–1% by weight F as analyzed in the final glass. Example 3 of Table I represents the most preferred embodiment.

We claim:

1. An anhydrous glass suitable for being molded or otherwise shaped under pressure at temperatures below about 450° C. having a base composition wherein $Al_2O_3$ is essentially absent consisting essentially, expressed in mole percent as analyzed on the oxide basis, of at least 20% but less than 50% $P_2O_5$, 15–45% $R_2O$, wherein $R_2O$ consists of 0–45% $Li_2O$, 0–20% $Na_2O$, and 0–10% $K_2O$, and 0–20% RO, wherein RO consists of 0–10% MgO, 0–15% CaO, 0–20% SrO, and 0–20% BaO, with about 0.3–3% by weight F as analyzed in the final glass.

2. A glass according to claim 1 also containing up to 20% PbO, up to 7% $La_2O_3$, and up to 12% ZnO, the total of said ingredients not exceeding about 25%.

3. A glass according to claim 1 also containing up to 25% $B_2O_3$ when said $P_2O_5$ content is less than about 30%.

4. A glass according to claim 1 also containing up to about 5% $B_2O_3$ when said $P_2O_5$ content is greater than about 45%.

5. A glass according to claim 1 suitable for being molded or otherwise shaped under pressure at temperatures below about 350° C. having a base composition consisting essentially of at least 40% $P_2O_5$, 17–25% $Li_2O+Na_2O$, consisting of 5–15% $Li_2O+5$–15% $Na_2O$, 10–15% BaO, and 10–15% PbO with about 0.3–1% F.

* * * * *